United States Patent [19]

Homma

[11] Patent Number: 4,809,042
[45] Date of Patent: Feb. 28, 1989

[54] LIGHT BEAM SCANNING DEVICE AND ELECTRONIC PHOTOGRAPHIC RECORDING DEVICE USING THE SAME

[75] Inventor: Yoshifumi Homma, Hitachi, Japan

[73] Assignee: Hitachi, Ltd., Tokyo, Japan

[21] Appl. No.: 67,015

[22] Filed: Jun. 29, 1987

[30] Foreign Application Priority Data

| Jun. 27, 1986 | [JP] | Japan | 61-149537 |
| Jun. 27, 1986 | [JP] | Japan | 61-149538 |
| Sep. 18, 1986 | [JP] | Japan | 61-218049 |
| Sep. 18, 1986 | [JP] | Japan | 61-218050 |

[51] Int. Cl.$^4$ .............................. G03G 15/00
[52] U.S. Cl. ................... 355/8; 355/3 R; 346/76 L
[58] Field of Search ............. 355/8, 3 R; 346/108, 346/107 R, 160, 76 L; 358/296, 300, 302; 350/6.5

[56] References Cited

U.S. PATENT DOCUMENTS

| 4,129,376 | 12/1978 | Yotsukura | 355/3 R X |
| 4,358,197 | 11/1982 | Kukucka et al. | 355/14 SH X |
| 4,447,112 | 5/1984 | Matsuoka et al. | 350/6.5 |
| 4,674,825 | 6/1987 | Takeoka et al. | 350/6.5 X |

FOREIGN PATENT DOCUMENTS

| 0217325 | 4/1987 | European Pat. Off. | 346/160 |
| 57-144516 | 9/1982 | Japan . | |
| 58198063 | 11/1983 | Japan | 355/8 |

Primary Examiner—A. C. Prescott
Assistant Examiner—Jane Lav
Attorney, Agent, or Firm—Antonelli, Terry & Wands

[57] ABSTRACT

A laser beam printer, in which a laser beam outputted by a laser diode pulse-modulated and controlled is deviated to be swept by means of a polygon mirror and folded by a reflecting mirror, after having passed through an F$\theta$ lens including two single lenses, so that it traverses the space between the two single lenses and reaches a light sensitive drum in order to expose it thereto.

19 Claims, 8 Drawing Sheets

LIGHT BEAM SCANNING DEVICE AND ELECTRONIC PHOTOGRAPHIC RECORDING DEVICE USING THE SAME

BACKGROUND OF THE INVENTION

1. Field of the Invention

This invention relates to a light beam scanning device, more in particular to a light beam scanning device, which is suitable to a recording device, in which a toner image is formed on a photosensitive recording medium by the electronic photographic process and image information is recorded by transferring this toner image on recording paper, and to an electronic photographic recording device using this light beam scanning device.

2. Description of the Prior Art

An electronic photographic recording device, in which a toner image is formed on a photosensitive recording medium by the electronic photographic process and image information is recorded by transferring this toner image on recording paper, is disclosed in U.S. Pat. No. 4,383,755 (Inventors: Richard C. Fedder et al., Assignee; Burroughs Corporation). In such an electronic photographic recording device it is tried to make the device smaller while effectively utilizing the space within the device by folding a laser light beam by means of mirrors. In this U.S. Pat. No. 4,383,755 the laser light beam, which has passed through a polygon mirror and a lens system, is folded by a mirror so that it reaches a photosensitive drum, but the utilization efficiency of the space within the device is low.

Another electronic photographic recording device is disclosed in JP-A-59-157,661 (Inventors; Goro Oda et al). In this device, a laser light beam, which has passed a polygon mirror and lens system, is folded by a first mirror, then by a second mirror so that it travels between the lens system and the first mirror described above to reach a photosensitive drum. However, in this device disclosed in JP-A-59-157,661, too, the utilization of the space within the device is not satisfactory.

SUMMARY OF THE INVENTION

An object of this invention is to provide a light beam scanning device, which is made smaller by improving further the utilization efficiency of the space therewithin, and a small size electronic photographic recording device using this light beam scanning device.

In order to achieve this object, a light beam scanning device according to one aspect of this invention comprises:

means supporting a scanned medium;

a light source outputting a light beam towards the scanned medium supported by the means described above;

sweeping means deviating and sweeping the light beam emitted by the light source;

optical focusing means located on the optical path between the sweeping means and the scanned medium and focusing the light beam outputted by the sweeping means on the scanned surface of the scanned medium; and optical path deviating means located between the optical focusing means and the scanned medium and folding the light beam outputted by the optical focusing means so that the light beam reaches the scanned surface of the scanned medium, and wherein the optical focusing means is provided with a plurality of single lenses separated from each other and the optical path deviating means includes a relfecting mirror, which reflects the light beam passing through the plurality of single lenses and outputted so as to traverse the space between the plurality of single lenses and to reach the scanned medium.

An electronic photographic recording device constructed by using such a light beam scanning device is also in the scope of this invention.

DESCRIPTION OF THE PREFERRED EMBODIMENTS

Figure 1:
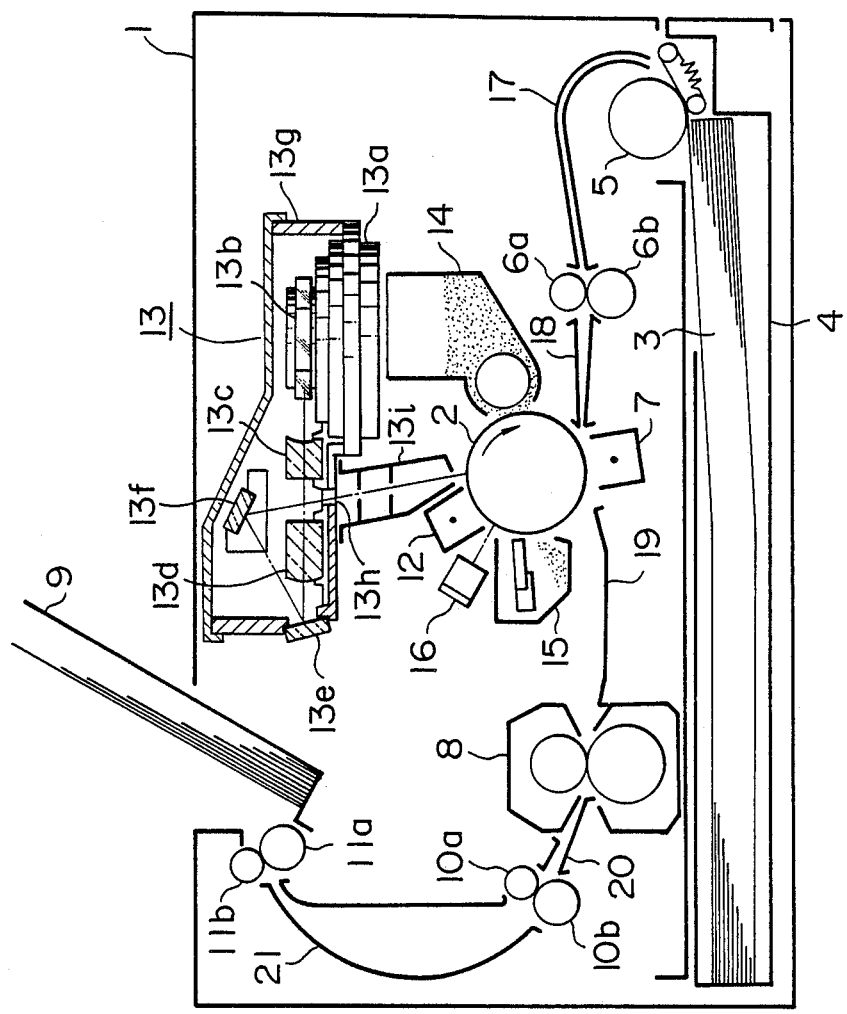
FIGS. 1, 11 and 12 are longitudinal cross-sectional views of three different electronic photographic recording devices using scanning optical systems according to this invention.

Referring to FIG. 1, within a case 1 of an electronic photographic recording device are disposed a photosensitive drum 1, on which a toner image is formed by the electronic photographic process; a paper supplying cassette 4, within which recording paper 3 is held; a paper supplying roller 5 extracting sheet by sheet the recording paper 3 held within the paper supplying cassette 4; a pair of resist rollers 6a, 6b regulating the forwarding timing of one sheet of recording paper 3 extracted by the paper supplying roller 5 so as to position it with respect to the toner image formed on the photosensitive drum 1; a transcriber 7 for transferring the toner image formed on the photosensitive drum 2 to the sheet of the recording paper 3; a fixing device 8 for fixing the toner image transferred on the recording paper 3 thereto; and pairs of paper evacuating rollers 10a, 10b and 11a, 11b for evacuating the sheet of recording paper 3, on which the toner image is fixed, to a paper evacuating tray 9. Further it is provided, as means for carrying out the electronic photographic process for the purpose of forming the toner image on the surface of the photosensitive drum 2, with a charger 12 for charging uniformly the surface of the photosensitive drum 2 with electricity; a laser beam scanning device 13 forming an electric latent image by scanning the uniformly charged photosensitive drum 2 with a laser light beam; a developing device 14 for developing the electric latent image formed on the surface of the photosensitive drum 2 by scanning it with the laser light beam in order to obtain the toner image thereon; a cleaner 15 for removing the toner remaining on the surface of the photosensitive drum 2 after having transcribed the toner image on the recording paper 3; and an erase lamp 16 for removing electric charge remaining on the surface of the photosensitive drum 2.

The photosensitive drum 2 is located approximately at the central portion of the case 1 and rotated in the direction indicated by the arrow by a driving mechanism not indicated in the figure. The paper supplying cassette 4 is located in the lower portion of the case 1 and so disposed that it is extracted from the case by sliding it backward (towards the right side in FIG. 1). A sheet of recording paper 3 extracted from this paper supplying cassette 4 by the paper supplying roller 5 is diverted by the first paper guide 17 so as to reach the resist rollers 6a and 6b. The recording paper 3, whose timing is regulated by the resist rollers 6a and 6b, is guided by the second paper guide 18 to the transcribing portion located under the photosensitive drum 2. The recording paper 3, on which the toner image is transcribed from the photosensitive drum 2 by the aid of the transcriber 7 in the transcribing portion, is guided by the third paper guide 19 to the fixing device 8. The recording paper 3, on which the toner image is fixed in the fixing device 8, is sent by the fourth paper guide 20 to the first paper evacuating rollers 10a and 10b, when it leaves the fixing device 8, and the recording paper 3 leaving the first paper evacuating rollers 10a and 10b is diverted to the upward direction by the fifth paper guide 21, sent to the second paper evacuating rollers 11a and 11b, and evacuated on the paper evacuating cassette 9 inserted on the upper surface of the case with the printed surface directed downward.

The laser beam scanning device 13 described above is located above the photosensitive drum 2 and provided with a polygon mirror 13b which, driven by a motor 13a rotates so as to deviate to sweep the laser beam; a first single lens 13c and a second single lens 13d disposed with a certain interval therebetween in order to constitute an Fθ lens system; a first mirror 13e folding the laser beam, which has been deviated by the polygon mirror 13b and passed through the two single lens 13c and 13d described above, towards a position above the Fθ lens system; a second mirror 13f for folding again the laser beam folded by the first mirror 13e downward and for making it traverse the space between the first and second single lenses 13c and 13d; a casing 13g supporting the motor 13a, the two single lenses 13c, 13d, the first mirror 13e and the second mirror 12f; a window 13h formed in this casing 13g, through which the laser beam folded by the second mirror 13f passes; and a dust proof case 13i disposed outside of the casing 13g so as to surround the outer periphery of the window 13h, which case guides the laser beam, which has passed through the window 13h, to the surface of the photosensitive drum 2. In the state indicated in FIG. 1 the polygon mirror 13b is on the right side with respect to the vertical line passing through the center of the photosensitive drum 2 and the second single lens 13d and the first mirror 13e are on the left side with respect thereto. In this way a great length of the optical path can be obtained with a small space by folding optical path of the laser light beam so as to make efficient use of the space above and below the Fθ lens system.

The developing device 14 is located in the space below the motor 13a driving the polygon mirror in the laser beam scanning device 13 described above and applies toner on the surface of the photosensitive drum 2, depending on the electric latent image, by rubbing the surface of the drum with a magnetic brush formed by making a magnetic roll absorb one-component developer consisting of fine magnetic powder toner or two-component developer consisting of a mixture of magnetic carrier and fine powder toner.

Since the laser beam scanning device 13 can be constructed to be small and located above the space, where the charging device 12 arranged around the photosensitive drum 2, the developing device 14, the transcriber 7, the cleaner 15 and the eraser 16 are disposed, the whole size of the electronic photographic process means can be made small.

Figure 2:
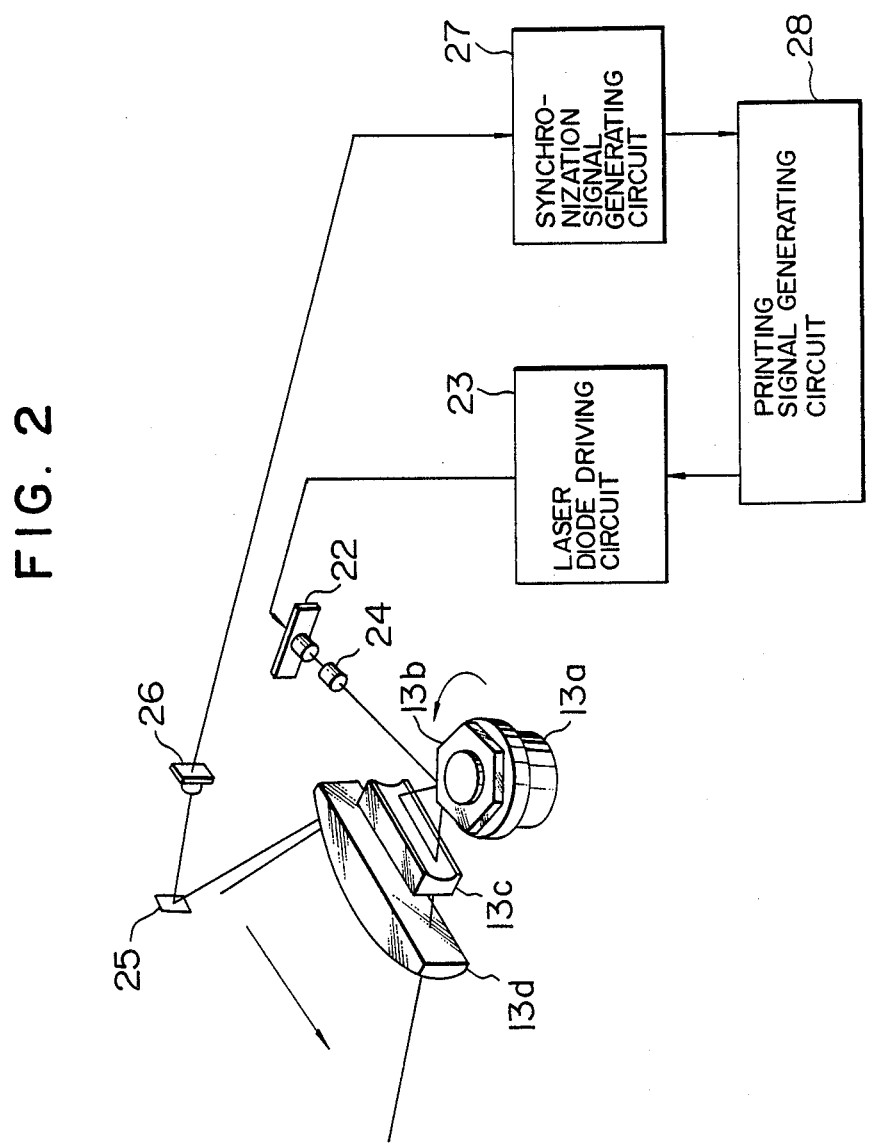
FIG. 2 is a perspective view of a scanning optical system including a block diagram of a laser diode control circuit.

The laser light beam is obtained by controlling to pulse-modulate the laser light outputted by a laser diode 22 by means of driving signals outputted by a laser diode driving circuit 23, as indicated in FIG. 2, and by focusing the laser light outputted by the laser diode by means of a coupling lens 24. The beam spot formed by this laser light beam on the surface of the photosensitive drum 2 moves (is swept) repeatedly parallelly to the direction of the axis of the photosensitive drum 2 on the surface thereof by deviating periodically the laser light beam by the rotation of the polygon mirror 13b. In order to synchronize the repeated sweep of this beam spot with the timing of the production of the driving signal, a small mirror 25 is disposed at the beginning position of the sweeping of the beam spot so that the laser light beam is reflected and led to the detector 26. When the laser light beam passes through this position, this detector 26 produces an electric signal. The electric signal outputted by this detector 26 is formed by a synchronization signal generating circuit 27 and transformed into a synchronization signal, which is inputted in a printing signal generating circuit 28. The printing signal generating circuit 28 produces a video signal, when it receives the synchronization signal from the synchronization signal generating circuit 27, which video signal is given to the laser diode driving circuit 23. The laser diode 22, the small mirror 25 and the detector 26 are mounted on the casing 13g of the laser light beam scanning device 13 described above.

Now some examples of modification of the laser light beam scanning device 13 will be explained, referring to FIGS. 3 to 10. Each of the examples of modification is provided with a dust-proof case 13i, which is omitted in the figures.

Figure 3:
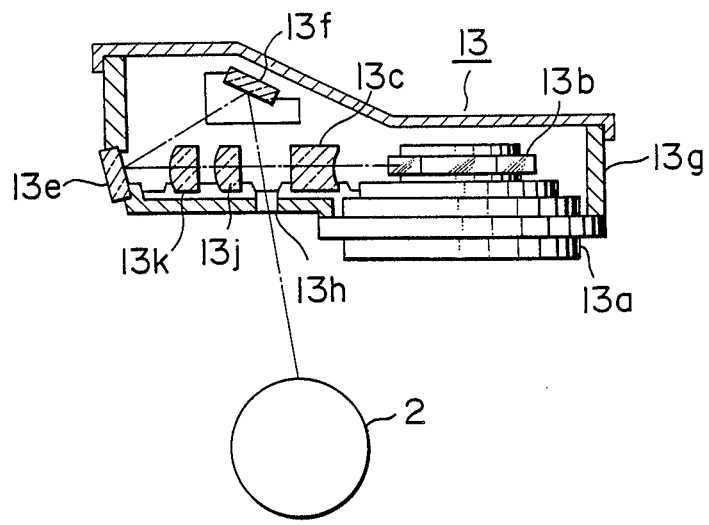
FIGS. 3, 4, 5, 6, 7, 8, 9 and 10 are longitudinal cross-sectional views of scanning optical systems according to this invention.

In the example of modification indicated in FIG. 3, the second single lens 13d of the Fθ lens system in the embodiment indicated in FIG. 1 is replaced by two single lenses 13j and 13k. In the case of this example of modification it is also possible to make the laser light beam folded by the second mirror 13f pass through the space formed between the two single lenses 13j and 13k.

Figure 4:
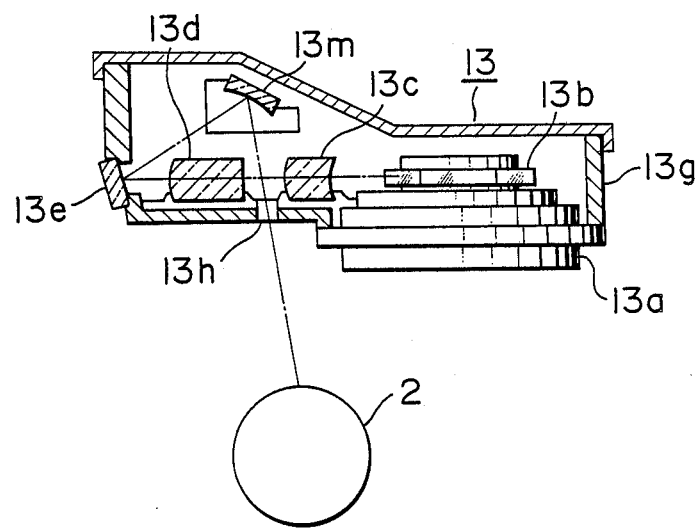

In the example of modification indicated in FIG. 4, the second mirror 13f in the embodiment indicated in FIG. 1 is replaced by a concave mirror 13m. When the second mirror is non-planar in such a manner, the freedom of the design of the optical system is increased.

Figure 5:
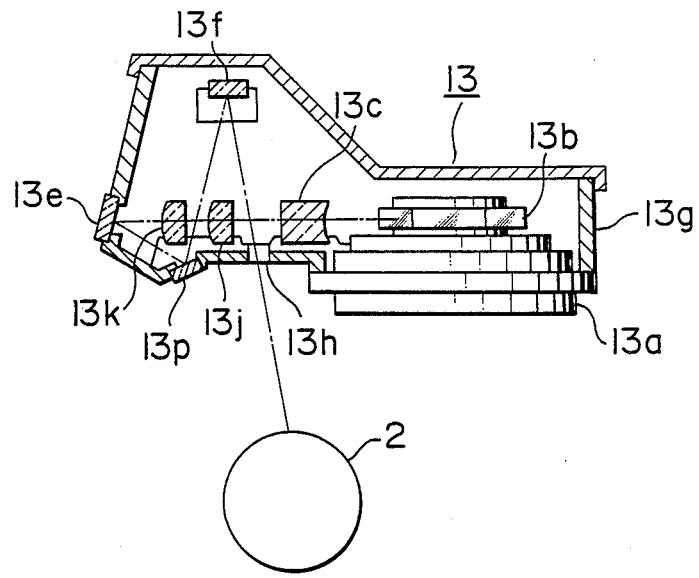

In the example of modification indicated in FIG. 5, the example of modification indicated in FIG. 3 is further modified in such a manner that there are three mirrors folding the laser light beam. The laser light beam, which has passed through the Fθ lens system, is folded at first by a first mirror 13e towards a position below the Fθ lens system and then upward by a third mirror 13p so that it traverses the space between two single lenses 13j and 13k and is projected to a second mirror 13f. Next, it is folded downward by this second mirror 13f so that it traverses the space between the first and second single lenses 13c and 13j and reaches the photosensitive drum 2.

Figure 6:
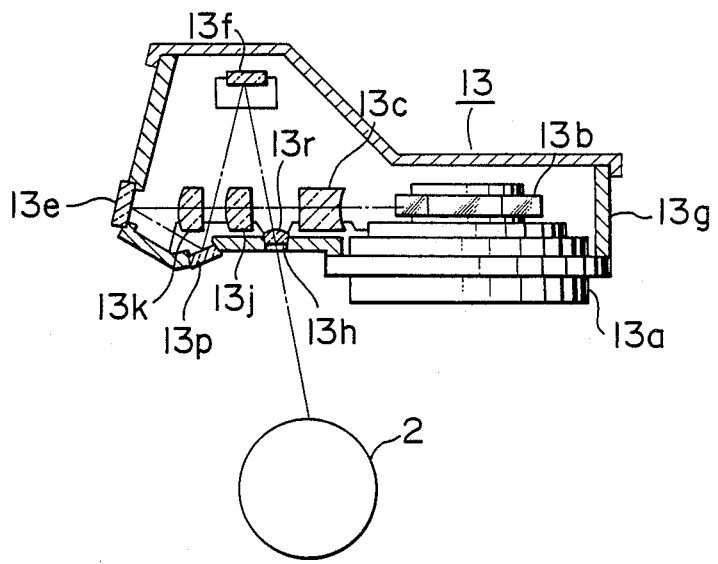
Figure 7:
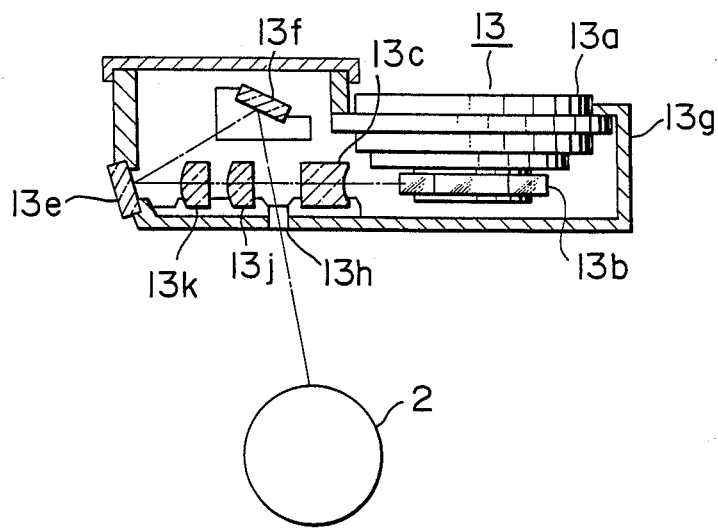
Figure 8:
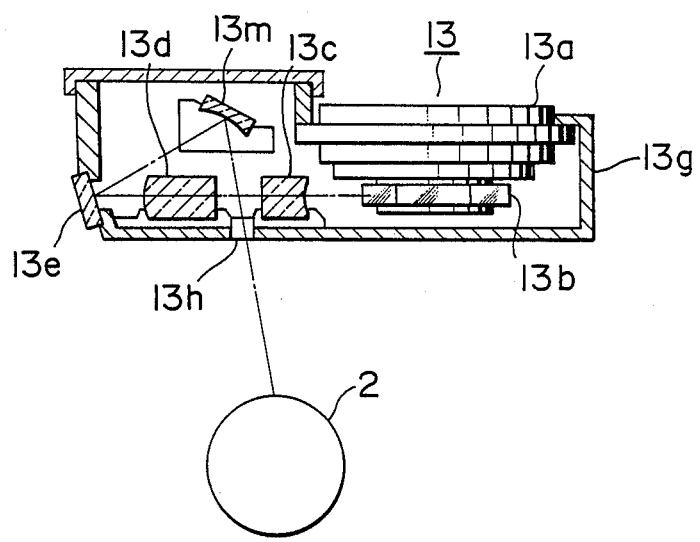
Figure 9:
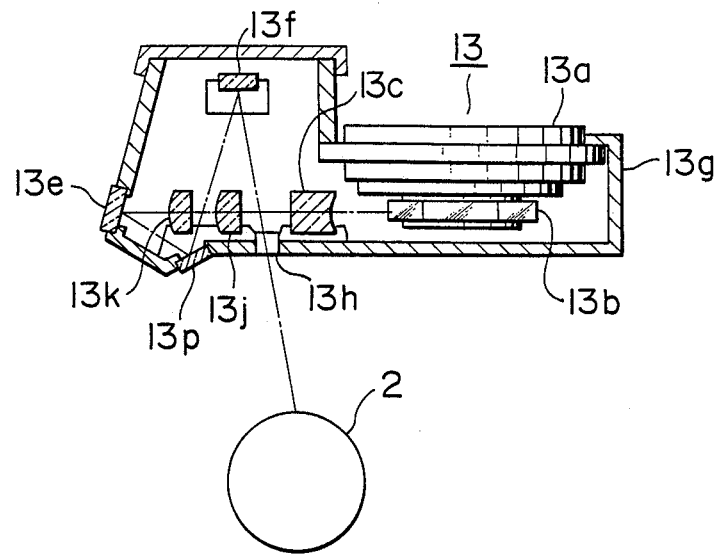
Figure 10:
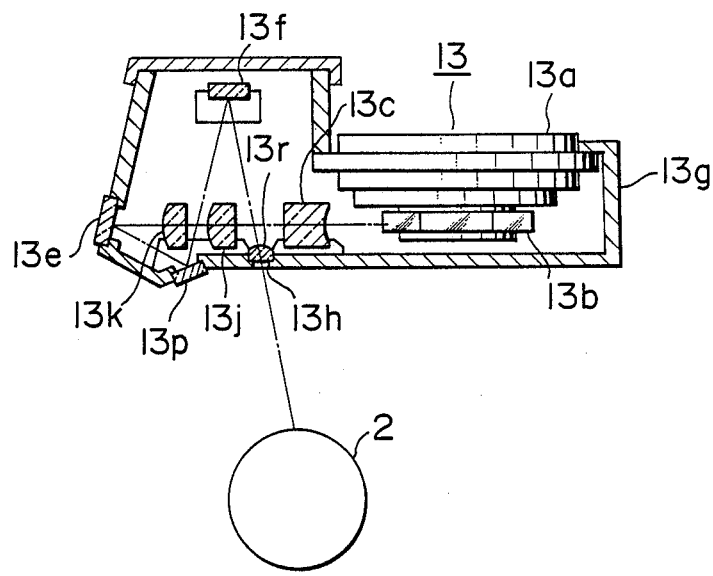

In the example of modification indicated in FIG. 6 a convex cylindrical lens 13r is disposed in a window 13h of the casing 13g used in the modification shown in FIG. 5 and an inclined surface correcting optical system of the polygon mirror 13b is constructed by this cylindrical lens 13r.

In the examples of modification indicated in FIGS. 7 to 10, the examples of modification indicated in FIGS. 3 to 6 are further modified, in each of which the polygon mirror driving motor 13a is disposed above the polygon mirror 13b. The polygon mirror driving motor 13a can be disposed above the polygon mirror 13b also in the embodiment indicated in FIG. 1.

When, in such a manner, the polygon mirror driving motor 13a is disposed above the polygon mirror 13b, since the space between the laser beam scanning device 13 is enlarged, it is possible to enlarge the developing device 14 located in this space and thus the hopper for the developer.

Figure 11:
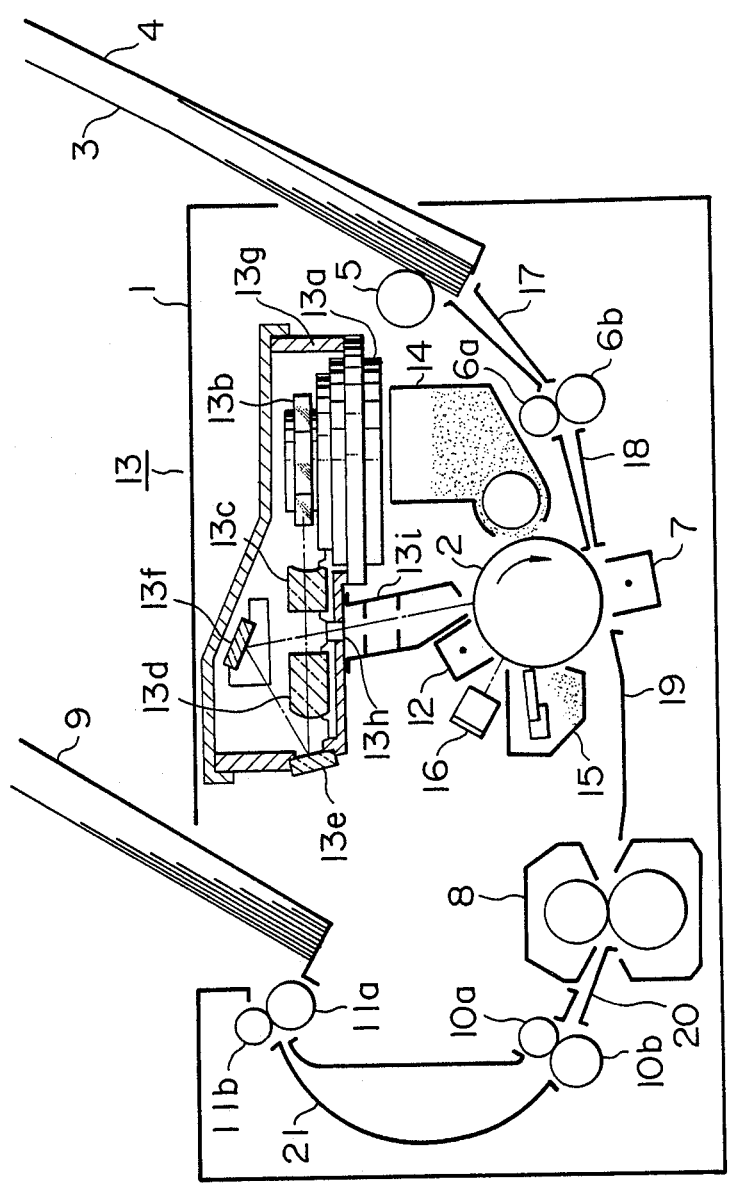

In the embodiment indicated in FIG. 11 the paper supplying cassette 4 in the embodiment indicated in FIG. 1 is located at the upper portion behind (on the right side in the figure) the case 1, directed upward. In this way, since the recording paper conveying path from the paper supplying cassette 4 to the resist rollers 6a and 6b is straightened, the risk of paper jam is reduced. Further, since the whole recording paper conveying path can be arranged so as to surround the electronic photographic process means, it is possible to obtain a small size electronic photographic recording device making efficient use of the space surrounding the electronic photographic process means.

Figure 12:
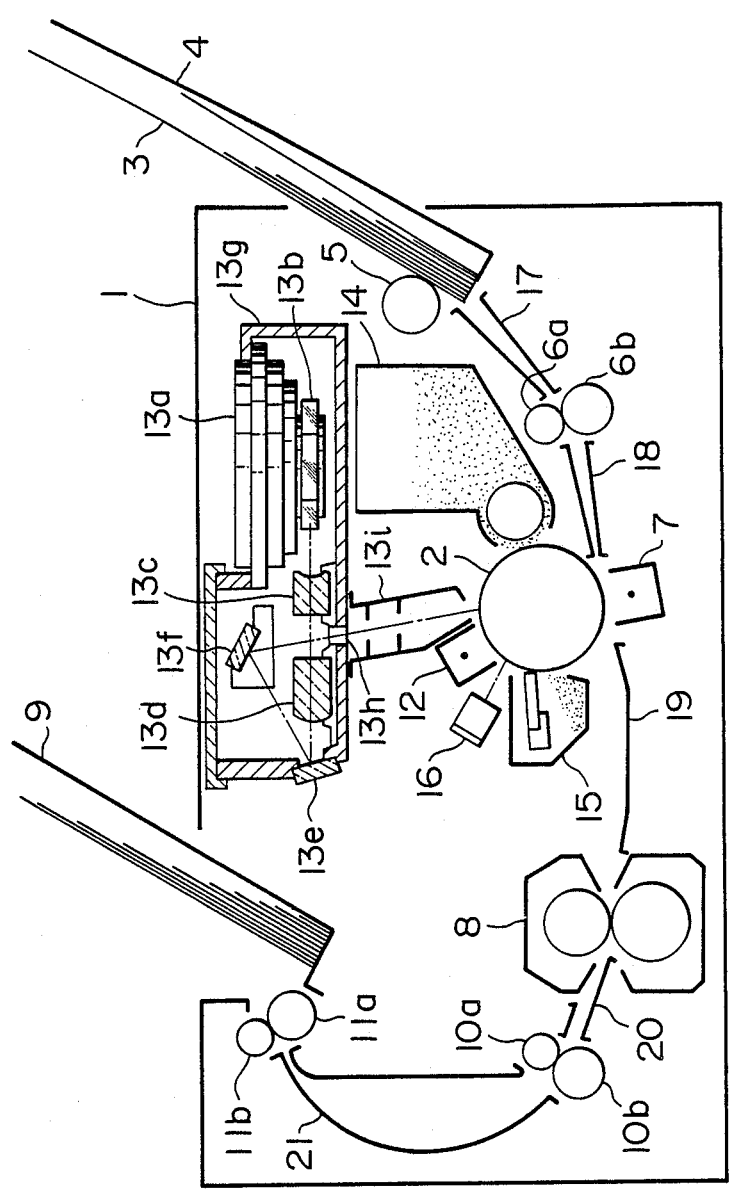

In the embodiment indicated in FIG. 12, the polygon mirror driving motor 13a in the embodiment indicated in FIG. 11 is located above the polygon mirror 13b. In this way, an effect that the developing device 14 can be enlarged is obtained beside the advantages explained for the embodiment indicated in FIG. 11.

I claim:

1. An optical scanning system comprising:
   means supporting a scanned medium;
   a light source outputting a light beam towards the scanned medium supported by said means;
   sweeping means deviating and sweeping the light beam emitted by said light source;
   optical focusing means located on the optical path between said sweeping means and said scanned medium and focusing the light beam outputted by said sweeping means on the scanned surface of said scanned medium; and
   optical path deviating means located between said optical focusing means and said scanned medium and folding the light beam outputted by said optical focusing means so that the light beam reaches the scanned surface of said scanned medium;
   wherein said optical focusing means is provided with a plurality of single lenses separated from each other and said optical path deviating means includes a reflecting mirror, which reflects the light beam passing through said plurality of single lenses and outputted so as to traverse the space between said plurality of single lenses and to reach said scanned medium.

2. An optical scanning system according to claim 1, wherein said optical source is provided with laser beam generating means.

3. An optical scanning system according to claim 1 or 2, wherein said light beam deviating and sweeping means is provided with a rotating polygonal mirror.

4. An optical scanning system according to claim 3, wherein said light beam deviating and sweeping means includes driving means for driving said rotating polygonal mirror located above said rotating polygonal mirror.

5. An optical scanning system according to claim 1, wherein said plurality of single lenses of said optical focusing means constitute an F$\theta$ lens system and said scanned medium is scanned linearly with a light spot of said light beam formed by said F$\theta$ lens system.

6. An optical scanning system according to claim 5, wherein said optical focusing means includes two single lenses and one of the two single lenses located at a side of said scanned medium with respect to a path of the light beam has a toric surface.

7. An optical scanning system according to claim 5, wherein said optical focusing means focusing said light beam on the scanned surface of said scanned medium includes a convex cylindrical lens located at a position, which is closest to said scanned means.

8. An optical scanning system according to claim 1, wherein said optical path deviating means is provided with a first reflecting mirror folding said light beam, which is outputted after having passed through said plurality of single lenses, and a second reflecting mirror, which folds again said light beam folded by said first reflecting mirror so as to traverse the space between said single lenses and to reach said scanned medium.

9. An optical scanning system according to claim 1 or 8, wherein said reflecting mirrors include non-planar lenses.

10. An optical scanning system according to claim 1, wherein said scanned medium is a photoconductive light sensitive body in an electronic photographic device.

11. An electronic photographic device comprising:
    light sensitive recording medium;
    charging means charging electrically said light sensitive recording medium;
    a light source outputting a light beam intensity-modulated by image information towards said light sensitive recording medium;
    optical scanning means for deviating and sweeping said light beam emitted by said light source;
    optical focusing means located between said optical scanning means and said light sensitive recording medium, for focusing said light beam outputted by said optical scanning means so as to form a light beam spot on the scanned surface of said scanned medium and to expose it to the light beam;
    optical path deviating means located between said optical focusing means and said scanned medium, for folding the light beam outputted by said optical focusing means so that the light beam reaches the scanned surface of said scanned medium;
    developing means for developing a latent image formed on said light sensitive recording medium to form a toner image thereon;
    recording paper forwarding means for transporting said recording paper so that it is brought into contact with said light sensitive recording medium, on which said toner image is formed;
    transcribing means for transcribing said toner image to said recording paper brought into contact with said light sensitive recording medium, on which said toner image is formed;
    fixing means for fixing said toner image transcribed on said recording paper; an image being recorded by the electronic photographic process, by which said toner image obtained by electrically charging, exposing to said light beam, and developing the surface of said light sensitive recording medium is transcribed on said recording paper and said toner image transcribed on said recording paper is fixed;
    wherein said optical focusing means is provided with a plurality of single lenses separated from each other and said optical path deviating means includes a reflecting mirror, which relfects the light beam passing through said plurality of single lenses and outputted so as to traverse the space between said plurality of single lenses and to reach said scanned medium.

12. An electronic photographic device according to claim 11, in which said recording paper forwarding means comprises a paper supplying cassette including said recording paper located under said means for said electronic photographic process.

13. An electronic photographic device according to claim 11, in which said recording paper forwarding means comprises a paper evacuating tray located over the horizontal plane passing through the center of said light sensitive medium.

14. An electronic photographic device according to claim 11, in which said transcribing means in said means for said electronic photographic process is located below the horizontal plane passing through the center of said light sensitive medium.

15. An electronic photographic device according to claim 11, in which all of said optical means are located above the horizontal plane passing through the center of said light sensitive medium in said means for said electronic photographic process.

16. An electronic photographic device according to claim 11, in which said optical scanning means is provided with a rotating polygonal mirror, which is located on the side opposite to said fixing means in said means for said electronic photographic process with respect to the center of said light sensitive medium.

17. An electronic photographic device comprising:
light sensitive recording medium;
charging means for charging electrically said light sensitive recording medium;
a light source outputting a light beam intensity-modulated by image information towards said light sensitive recording medium;
optical scanning means for deviating and sweeping said light beam emitted by said light source;
optical focusing means located between said optical scanning means and said light sensitive recording medium for focusing said light beam outputted by said optical scanning means so as to form a light beam spot on the scanned surface of said scanned medium and to expose it to the light beam;
optical path deviating means located between said optical focusing means and said scanned medium for folding the light beam outputted by said optical focusing means so that the light beam reaches the scanned surface of said scanned medium;
developing means for developing a latent image formed on said light sensitive recording medium to form a toner image thereon;
recording paper forwarding means for transporting said recording paper so that it is brought into contact with said light sensitive recording medium, on which said toner image is formed;
transcribing means for transcribing said toner image to said recording paper brought into contact with said light sensitive recording medium, on which said toner image is formed;
fixing means for fixing said toner image transcribed on said recording paper; an image being recorded by the electronic photographic process, by which said toner image obtained by electrically charging, exposing to said light beam, and developing the surface of said light sensitive recording medium is transcribed on said recording paper and said toner image transcribed on said recording paper is fixed;
wherein said optical focusing means is provided with a plurality of single lenses separated from each other; said optical path deviating means includes a reflecting mirror, which reflects the light beam passing through said plurality of single lenses and outputted so as to traverse the space between said plurality of single lenses and to reach said scanned medium; and in said recording paper forwarding means a paper supplying cassette including said recording paper and a paper evacuating tray are located above the horizontal plane passing through the center of said light sensitive medium.

18. An electronic photographic device according to claim 13, in which said paper evacuating tray accommodates sheets of recording paper with recorded images thereon, said recording paper forwarding means includes means for evacuating the sheets of recording paper with recorded images thereon onto said paper evacuating tray so that the sheets of recording paper with images recorded thereon are piled up one after another with the recorded surface thereof being directed downwardly.

19. An electronic photographic device according to claim 17, in which said paper supplying cassette accommodates recording paper on which a toner image is to be recorded, said paper evacuating tray enables said recording paper with the toner image recorded thereon to be piled up thereon, said recording paper forwarding means includes means for extracting the recording paper from said paper supply cassette for transporting said recording paper so that it is brought into contact with said light sensitive recording medium, on which said toner image is formed, for transporting said recording paper with said toner image transcribed thereon, and for evacuating onto said paper evacuating tray said recording paper which has been recorded and on which the toner image has been fixed, said optical focusing means and said optical path deviating means being sandwiched between recording paper conveying paths from the recording paper supply to the evacuation thereof by said recording paper forwarding means.

* * * * *